US009073288B2

(12) United States Patent
Oda et al.

(10) Patent No.: US 9,073,288 B2
(45) Date of Patent: Jul. 7, 2015

(54) METHOD OF PRODUCING A FIBER-REINFORCED PLASTIC

(75) Inventors: Tetsuya Oda, Toyota (JP); Yuji Kageyama, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 13/981,843

(22) PCT Filed: Jan. 27, 2011

(86) PCT No.: PCT/JP2011/051544
§ 371 (c)(1),
(2), (4) Date: Jul. 25, 2013

(87) PCT Pub. No.: WO2012/101793
PCT Pub. Date: Aug. 2, 2012

(65) Prior Publication Data
US 2013/0309465 A1    Nov. 21, 2013

(51) Int. Cl.
*B32B 5/10* (2006.01)
*B29C 45/14* (2006.01)
(Continued)

(52) U.S. Cl.
CPC .......... *B32B 5/10* (2013.01); *Y10T 428/24942* (2015.01); *B29C 45/14* (2013.01); *B29K 2105/12* (2013.01); *B32B 7/02* (2013.01); *B32B 27/08* (2013.01); *B32B 2307/702* (2013.01); *B32B 2307/704* (2013.01); *B32B 2419/00* (2013.01); *B32B 2605/08* (2013.01); *B32B 2605/18* (2013.01); *B29C 65/5057* (2013.01); *B29C 66/1122* (2013.01); *B29C 66/524* (2013.01); *B29C 66/73115* (2013.01); *B29C 66/73117* (2013.01); *B29C 66/73771* (2013.01); *B29C 66/73775* (2013.01); *B29C 66/72141* (2013.01); *B29C 43/18* (2013.01); *B29C 43/20* (2013.01); *B29C 70/68* (2013.01);
(Continued)

(58) Field of Classification Search
None
See application file for complete search history.

(56) References Cited

U.S. PATENT DOCUMENTS

2005/0266224 A1    12/2005    Husler et al.

FOREIGN PATENT DOCUMENTS

| JP | 02-172731 A | 7/1990 |
|---|---|---|
| JP | 02266935 | 10/1990 |

(Continued)

*Primary Examiner* — Edmund Lee
(74) *Attorney, Agent, or Firm* — Sughrue Mion, PLLC

(57) ABSTRACT

With respect to fiber-reinforced plastics in which a base member is at least partially reinforced with a continuous fiber-reinforced resin member, there is provided a fiber-reinforced plastic in which the continuous fibers forming the continuous fiber-reinforced resin member do not bend, and, further, the base member and the continuous fiber-reinforced resin member are made to favorably adhere to each other, as well as a method of producing same. Provided is a fiber-reinforced plastic in which at least a portion of the base member is laminated with, as a reinforcement member, the continuous fiber-reinforced resin member. An adhesion layer comprising a thermoplastic resin is present between the base member and the reinforcement member, the adhesion layer making the two adhere to each other. With respect to the thermoplastic resin of the reinforcement member, assuming $Tg1$ denotes its glass transition point if it is an amorphous plastic, or $Tm1$ its melting point if it is a crystalline plastic, and with respect to the thermoplastic resin of the adhesion layer, assuming $Tg2$ denotes its glass transition point if it is an amorphous plastic, or $Tm2$ its melting point if it is a crystalline plastic, then $Tg1 > Tg2$ or $Tm2$, or $Tm1 > Tg2$ or $Tm2$.

2 Claims, 4 Drawing Sheets

(51) Int. Cl.
*B32B 7/02* (2006.01)
*B32B 27/08* (2006.01)
*B29C 65/50* (2006.01)
*B29C 65/00* (2006.01)
*B29C 43/18* (2006.01)
*B29C 43/20* (2006.01)
*B29C 70/68* (2006.01)
*B29C 65/48* (2006.01)
*B29K 105/12* (2006.01)
*B29C 45/00* (2006.01)

(52) U.S. Cl.
CPC ...... *B29C 65/4815* (2013.01); *B29C 66/72143* (2013.01); *B29C 66/73921* (2013.01); *B29C 66/71* (2013.01); *B29C 66/73116* (2013.01); *B29C 66/73118* (2013.01); *B29C 45/14311* (2013.01); *B29C 45/14786* (2013.01); *B29C 45/0005* (2013.01); *B29C 66/45* (2013.01); *B29C 66/5326* (2013.01)

(56) References Cited

FOREIGN PATENT DOCUMENTS

| | | |
|---|---|---|
| JP | 04-261841 A | 9/1992 |
| JP | 11-020017 A | 1/1999 |
| JP | 2005-324340 A | 11/2005 |
| JP | 2005-538864 A | 12/2005 |

(a)

(b)

(a)

Glass fiber (c)

Glass fiber (b)

Nylon 6   Glass fiber (d)

Glass fiber (parts in white) uniformly aligned substantially unidirectionally within nylon 6

(e)

Parts in black: Glass fiber
Parts in white: Nylon 6 ated Jan. 27, 2011, the contents of all
METHOD OF PRODUCING A FIBER-REINFORCED PLASTIC

CROSS REFERENCE TO RELATED APPLICATIONS

This is a National Stage of International Application No. PCT/JP2011/051544, filed Jan. 27, 2011, the contents of all of which are incorporated herein by reference in their entirety.

TECHNICAL FIELD

The present invention relates to a fiber-reinforced plastic in which at least a portion of a resin member, which is a base member, is laminated with, as a reinforcement member a continuous fiber-reinforced resin member, in which continuous fibers are mixed into a thermoplastic resin as a matrix resin, the fiber-reinforced plastic being reinforced by this laminated portion, as well as to a method of producing same.

BACKGROUND ART

Due to their light weight and high strength, fiber-reinforced plastics (FRPs) in which a reinforcement fiber material is mixed into a resin are used in various industries, e.g., automobile, construction, aviation, etc.

By way of example, with respect to the automobile industry, the above-mentioned fiber-reinforced plastics are employed as structural members of vehicles, e.g., pillars, rockers, underfloor floors, etc., and as non-structural members that require design, e.g., door outer panels, hoods, etc. Attempts have been made to produce fuel-efficient and environment-friendly vehicles by ensuring vehicle strength while reducing its weight.

With respect to the base members that form the above-mentioned structural members and non-structural members, there are those that are planar in shape, those that are three-dimensional with two or more intersecting flat surfaces, those that are three-dimensional with a curved shape or that combine curved surfaces and flat surfaces, and, further, those in which reinforcement ribs are integrally formed with the above, among others.

Such base members are formed from, for example, a material in which a long fiber material that is 50 mm in length or less is unidirectionally oriented in the matrix resin. However, due to their use of long fiber materials, they have a problem in that they have poor in-mold moldability.

This problem is particularly pronounced when the base member integrally comprises a reinforcement member, e.g., the ribs mentioned above, etc. As such, in order to improve moldability, there are methods in which the base member (or at least the ribs thereof) is/are molded from, for example, a resin material in which short fibers that are 1 mm in length or less are randomly oriented within the matrix resin.

In the case of a base member thus molded from short fibers, by reinforcing an appropriate portion of the base member with a continuous fiber-reinforced resin member, a fiber-reinforced plastic partially reinforced with the continuous fiber-reinforced resin member and having favorable strength properties may be produced while also improving the moldability of the base member.

The continuous fiber-reinforced resin member mentioned above comprises a unidirectional member (UD member) in which a fiber material exceeding 50 mm in length is unidirectionally oriented within a matrix resin, or a quasi-isotropic member (a multiaxial laminated member, a fabric comprising warp threads and weft threads, etc.).

In methods for producing such fiber-reinforced plastics comprising a base member, a portion of which is reinforced with a continuous fiber-reinforced resin member, the continuous fiber-reinforced resin member is disposed in the cavity of a mold, and molten resin for the base member is subsequently injected into the cavity, or molten resin is disposed in the cavity and pressed, in order to make the two adhere to each other and integrate them (since both of the above overmold the molten resin for the base member onto the continuous fiber-reinforced resin member, they are referred to as overmolding). It is noted that Patent Literature 1 discloses a method of producing a fiber-reinforced plastic that is partially reinforced with a continuous fiber-reinforced resin member, wherein a preheated continuous fiber-reinforced resin member is disposed in a mold, a molten long fiber thermoplastic material (LFT) is disposed in the mold, and press molding is performed.

However, the present inventors have identified a problem with respect to overmolding, namely that the continuous fiber-reinforced resin member becomes softened by being heated to its melting point or above due to the heat of the base member molten resin, and the continuous fiber forming the continuous fiber-reinforced resin member bends, resulting in a significant drop in its physical properties. Further, in the case of, for example, a continuous fiber-reinforced resin member comprising a UD member, when the continuous fiber bends and its angle is consequently offset by 3 degrees, its physical property (tensile strength) is known to deteriorate by approximately 10%, or by approximately 50% if it is offset by 12 degrees.

Therefore, with regard to fiber-reinforced plastics that comprise a base member that is reinforced, in part or in whole, with a continuous fiber-reinforced resin member, a fiber-reinforced plastic in which a base member and a continuous fiber-reinforced resin member are favorably made to adhere to each other without causing the continuous fibers forming the continuous fiber-reinforced resin member to bend, as well as developing a production method for same are pressing issues in this field.

CITATION LIST

Patent Literature

Patent Literature 1: JP Patent Application Publication (Kohyo) No. 2005-538864 A

SUMMARY OF INVENTION

Technical Problem

The present invention is made in view of the problems mentioned above, and an object thereof is to provide, with respect to fiber-reinforced plastics in which a base member is at least partially reinforced with a continuous fiber-reinforced resin member, a fiber-reinforced plastic in which continuous fibers forming a continuous fiber-reinforced resin member does not become bent, and, further, in which the base member and the continuous fiber-reinforced resin member are made to adhere to each other favorably, as well as a method of producing same.

Solution to Problem

In order to achieve the object above, a fiber-reinforced plastic according to the present invention is such that at least a portion of a resin member, which is a base member, is laminated with, as a reinforcement member, a continuous fiber-reinforced resin member in which a continuous fiber is mixed into a thermoplastic resin, which is a matrix resin, and the fiber-reinforced plastic is reinforced by this laminated portion. At the laminated portion, an adhesion layer is present between the base member and the reinforcement member, the adhesion layer comprising a thermoplastic resin that makes the two adhere to each other. With respect to the thermoplastic resin of the reinforcement member, assuming Tg1 denotes its glass transition point if it is an amorphous plastic, or Tm1 its melting point if it is a crystalline plastic, and with respect to the thermoplastic resin of the adhesion layer, assuming Tg2 denotes its glass transition point if it is an amorphous plastic, or Tm2 its melting point if it is a crystalline plastic, then Tg1>Tg2 or Tm2; or Tm1>Tg2 or Tm2.

A fiber-reinforced plastic of the present invention is reinforced, in part or in whole, by making a reinforcement member comprising a continuous fiber-reinforced resin member adhere to an appropriate portion of a base member by lamination. An adhesion layer is present at the portion where the base member and the continuous fiber-reinforced resin member are laminated, the adhesion layer indirectly making the two adhere to each other. Further, its glass transition point or melting point is lower than the glass transition point or melting point of the matrix resin of the continuous fiber-reinforced resin member. Over the course of production, just the adhesion layer softens or melts first, thereby making the base member and the continuous fiber-reinforced resin member adhere to each other favorably without causing the continuous fiber-reinforced resin member to soften or melt, and, further, suppressing bends in the continuous fiber forming the continuous fiber-reinforced resin member.

In the case of non-structural members (design members), the base member would be formed from a resin member made solely of a matrix resin. In the case of structural members, the base member would be formed from a fiber-reinforced resin member in which short fibers, long fibers, etc., are mixed into a matrix resin.

The respective matrix resins of the base member, continuous fiber-reinforced resin member, and adhesion layer comprise a thermoplastic resin. With respect to the thermoplastic resin of the reinforcement member, assuming Tg1 denotes its glass transition point if it is an amorphous plastic, or Tm1 its melting point if it is a crystalline plastic, and with respect to the thermoplastic resin of the adhesion layer, assuming Tg2 denotes its glass transition point if it is an amorphous plastic, or Tm2 its melting point if it is a crystalline plastic, then Tg1>Tg2 or Tm2; or Tm1>Tg2 or Tm2. In other words, at least with respect to the reinforcement member and the continuous fiber-reinforced resin member, both may comprise crystalline plastics, or amorphous plastics, or one may comprise a crystalline plastic while the other comprises an amorphous plastic. In all cases, the two matrix resins are so set up as to satisfy the following: Tg1>Tg2 or Tm2; or Tm1>Tg2 or Tm2.

The term crystalline plastic above refers to those with high proportions of crystalline regions in which molecular chains are regularly arranged, that is, those with high crystallinity, examples of which may include polyethylene (PE), polypropylene (PP), nylon (PA: nylon 6, nylon 66, etc.), polyacetal (POM), and polyethylene terephthalate (PET), among others.

On the other hand, the term amorphous plastic refers to those with extremely low crystallinity, or which never crystallize, examples of which may include polystyrene (PS), polyvinyl chloride (PVC), polymethyl methacrylate (PMMA), ABS resin, and thermoplastic epoxy, among others.

Further, examples of fiber materials to be contained in the thermoplastic resins may include any one of, or a composite comprising two or more of: ceramic fibers such as boron, alumina, silicon carbide, silicon nitride, zirconia, etc.; inorganic fibers such as glass fiber, carbon fiber, etc.; metal fibers such as copper, steel, aluminum, stainless steel, etc.; and organic fibers such as polyamide, polyester, etc.

With the fiber-reinforced plastics mentioned above, the base member and the continuous fiber-reinforced resin member are made to adhere to each other favorably by the adhesion layer. Further, in forming such adhesion, the matrix resin of the continuous fiber-reinforced resin member does not soften or melt, or is less likely to soften or melt. Thus, bends in the continuous fibers are suppressed, and a high-strength fiber-reinforced plastic in which the desired physical properties (tensile strength, etc.) are ensured for the continuous fiber-reinforced resin member is obtained.

It is noted that with respect to the fiber-reinforced plastics of the embodiments mentioned above, there are no particular limitations with regard to the relations between the melting point or glass transition point of the base member and the melting points or glass transition points of the reinforcement member and the adhesion layer.

However, the melting point or glass transition point of the matrix resin of the base member is greater than at least the melting point or glass transition point of the adhesion layer, and it is preferable that the matrix resins of the reinforcement member and the base member be formed from the same material. With respect to a fiber-reinforced plastic integrated with an adhesion layer in-between, this would equalize such physical properties as linear expansion coefficient, Young's modulus, etc., between the two, thus making design management easier, while also suppressing any damage that may result if the two were to exhibit different heat distortion amounts.

In addition, the present invention also encompasses methods of producing a fiber-reinforced plastic in which at least a portion of a resin member, which is a base member, is laminated with, as a reinforcement member, a continuous fiber-reinforced resin member in which a continuous fiber is mixed into a thermoplastic resin, which is a matrix resin, the fiber-reinforced plastic being reinforced by this laminated portion, the method comprising: a step of preparing an adhesion layer and the reinforcement member in which, with respect to the thermoplastic resin of the reinforcement member, assuming Tg1 denotes its glass transition point if it is an amorphous plastic, or Tm1 its melting point if it is a crystalline plastic, and with respect to a thermoplastic resin of the adhesion layer, assuming Tg2 denotes its glass transition point if it is an amorphous plastic, or Tm2 its melting point if it is a crystalline plastic, then Tg1>Tg2 or Tm2, or Tm1>Tg2 or Tm2; and a step of disposing the reinforcement member within a cavity of a mold, disposing the adhesion layer on the reinforcement member, charging a resin material of the base member into the cavity to soften or melt the adhesion layer, and producing the fiber-reinforced plastic in which the reinforcement member and the base member are made to adhere to each other with the adhesion layer in-between.

In this production method, a reinforcement member and an adhesion layer (e.g., an adhesion sheet), both of fixed shapes, are disposed within a mold, and a resin material of a base member is charged into the cavity to soften or melt just the adhesion layer, thereby making the reinforcement member and the base member adhere to each other at an appropriate portion. The term "to charge" as used herein encompasses both injecting molten resin into the cavity, as well as disposing a lump of molten resin (a preheated preform) in the cavity.

In the latter case, press molding is subsequently carried out to integrate the base member and the reinforcement member.

With this production method, in the course of producing the fiber-reinforced plastic, by softening or melting just the adhesion layer as the resin material of the base member is charged into the cavity, it is possible to make, by means of this adhesion layer, the base member and the continuous fiber-reinforced resin member adhere favorably to each other. Further, in forming this adhesion, the matrix resin of the continuous fiber-reinforced resin member does not become softened or melted, or is less likely to be softened or melted. As a result, bends in the continuous fibers are suppressed, making it possible to produce a high-strength fiber-reinforced plastic in which the desired physical properties (tensile strength, etc.) are ensured for the continuous fiber-reinforced resin member.

In addition, another embodiment of a method of producing a fiber-reinforced plastic according to the present invention comprises: a step of preparing an adhesion layer and a reinforcement member in which, with respect to a thermoplastic resin of the reinforcement member, assuming $Tg1$ denotes its glass transition point if it is an amorphous plastic, or $Tm1$ its melting point if it is a crystalline plastic, and with respect to a thermoplastic resin of the adhesion layer, assuming $Tg2$ denotes its glass transition point if it is an amorphous plastic, or $Tm2$ its melting point if it is a crystalline plastic, then $Tg1>Tg2$ or $Tm2$, or $Tm1>Tg2$ or $Tm2$, and of producing an intermediate body by pressing the two within a mold; and a step of disposing the intermediate body within a cavity of another mold, charging a resin material of a base member into the cavity to soften or melt the adhesion layer, and producing the fiber-reinforced plastic in which the reinforcement member and the base member are made to adhere to each other with the adhesion layer in-between.

A further embodiment of a method of producing a fiber-reinforced plastic according to the present invention comprises: a step of preparing a resin material of an adhesion layer and a reinforcement member in which, with respect to a thermoplastic resin of the reinforcement member, assuming $Tg1$ denotes its glass transition point if it is an amorphous plastic, or $Tm1$ its melting point if it is a crystalline plastic, and with respect to a thermoplastic resin of the adhesion layer, assuming $Tg2$ denotes its glass transition point if it is an amorphous plastic, or $Tm2$ its melting point if it is a crystalline plastic, then $Tg1>Tg2$ or $Tm2$, or $Tm1>Tg2$ or $Tm2$; a step of disposing the reinforcement member within a cavity of a mold, charging the resin material of the adhesion layer into the cavity and causing it to cure; and a step of charging a resin material of a base member into the cavity to soften or melt the adhesion layer, and producing the fiber-reinforced plastic in which the reinforcement member and the base member are made to adhere to each other with the adhesion layer in-between.

All of the production methods above are capable of softening or melting just the adhesion layer upon charging the resin material of the base member into the cavity.

In addition, by employing the same material for the matrix resin of the base member and the matrix resin of the continuous fiber-reinforced resin member, as already mentioned, design management becomes easier, while also suppressing any damage caused due to varying heat distortion amounts, etc., of the constituent members of the fiber-reinforced plastic obtained.

Advantageous Effects of Invention

As can be understood from the explanation above, with a fiber-reinforced plastic of the present invention and a method of producing same, it is possible, with respect to a fiber-reinforced plastic in which a base member is partially reinforced with a reinforcement member comprising a continuous fiber-reinforced resin member, to provide a fiber-reinforced plastic in which, by virtue of the fact that an adhesion layer is present between the base member and the reinforcement member at the reinforced portion, and the fact that the glass transition point or melting point of this reinforcement member is higher than the glass transition point or melting point of the adhesion layer, the continuous fibers forming the reinforcement member do not bend and, further, the base member and the reinforcement member favorably adhere to each other.

DESCRIPTION OF EMBODIMENTS

Figure 1:
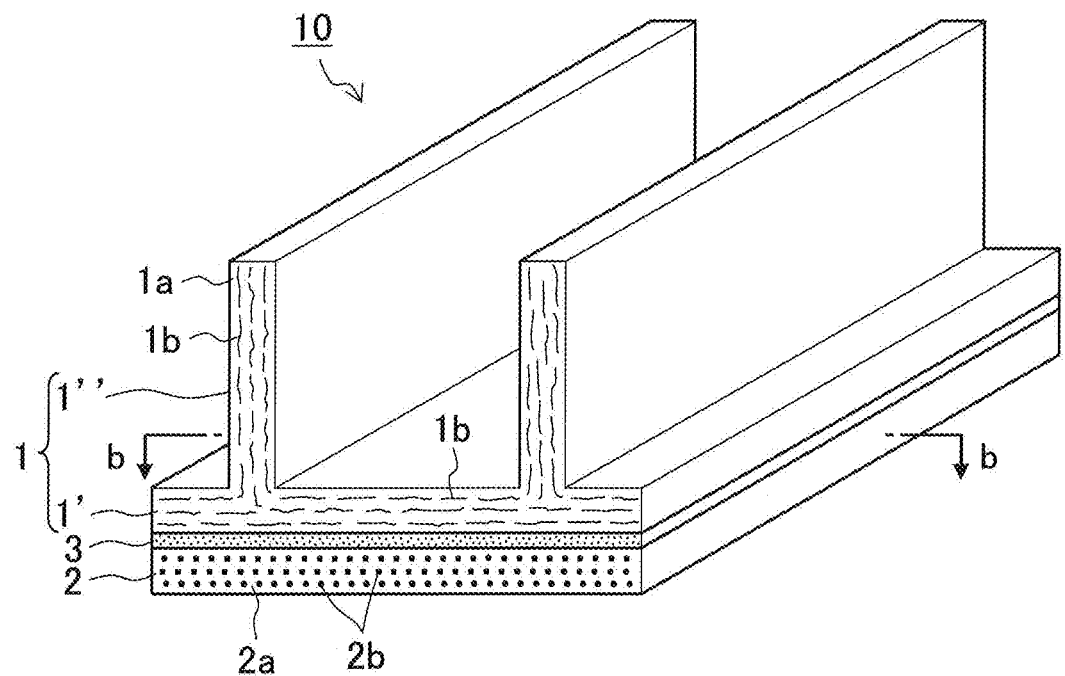
FIG. 1(a) is a perspective view of an embodiment of a fiber-reinforced plastic of the present invention, and (b) is a view of (a) taken along arrows b-b.
Figure 1:
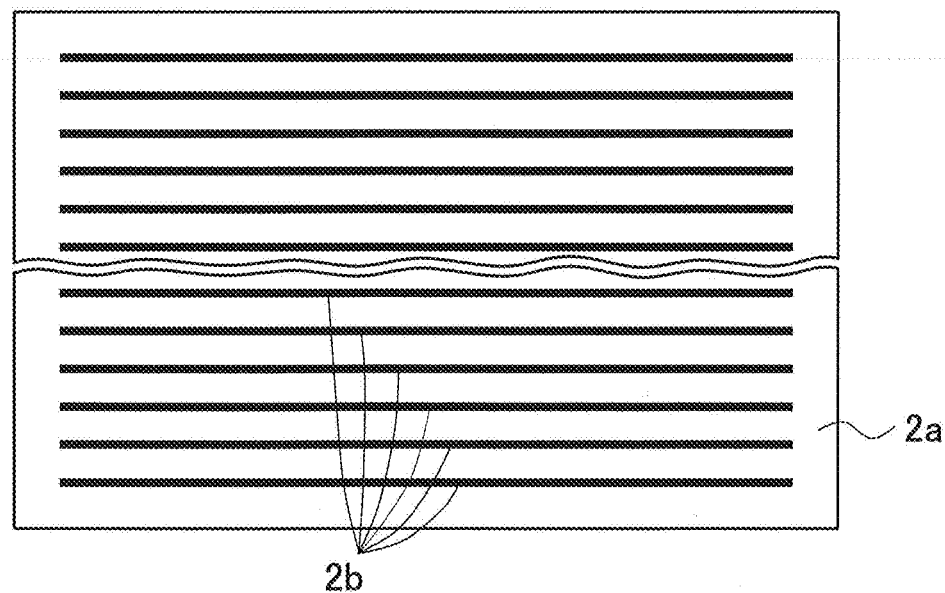

Embodiments of a fiber-reinforced plastic of the present invention and a method of producing same are described below with reference to the drawings. It is noted that while the illustrated fiber-reinforced plastics are configured in such a manner that the entire surface of a planar member of a base member comprising ribs is reinforced with a reinforcement member, the base member may of course also be without ribs, or of other various three-dimensional shapes. Further, just a portion of the base member may be reinforced with a reinforcement member.

FIG. 1a is a perspective view of an embodiment of a fiber-reinforced plastic of the present invention, and FIG. 1b is a view of FIG. 1a taken along arrows b-b.

Fiber-reinforced plastic 10 shown in the drawing generally comprises a base member 1 and a reinforcement member 2. The base member 1 is formed by integrally molding a planar member 1' and ribs 1" that reinforce the planar member 1'. The reinforcement member 2 reinforces the planar member 1' by adhering to the entire surface of the planar member 1' with an adhesion layer 3 in-between.

The base member 1 is a structural member for a vehicle, e.g., a pillar, a rocker, an underfloor floor, etc., and is molded from a resin material in which one, or both, of such discontinuous fiber materials 1b as short fibers that are 1 mm or less in length and long fibers that are 50 mm or less in length is/are mixed into a matrix resin 1a comprising a thermoplastic resin. More specifically, there are embodiments where the fiber material 1b forming the planar member 1' comprises long fibers and the fiber material 1b forming the ribs 1" comprises short fibers, embodiments where the fiber materials 1b forming both the planar member 1' and the ribs 1" both comprise long fibers or short fibers, and so forth. It is noted that for cases where the base member is a non-structural member that requires design, e.g., a door outer panel, a hood, etc., it may be molded from a resin material made solely of the matrix resin 1a without any fiber material.

On the other hand, the reinforcement member 2 is a continuous fiber-reinforced resin member in which unidirectionally oriented continuous fibers 2b, as shown in FIG. 1b, are mixed into a matrix resin 2a comprising a thermoplastic resin.

Although the illustrated reinforcement member 2 is thus a unidirectional member (UD member) in which the continuous fibers 2b exceeding 50 mm in length are unidirectionally oriented within the matrix resin 2a, it is also possible to employ quasi-isotropic members (e.g., 0° directional members, 90° directional members, ±45° directional members, multiaxial laminated members in which a plurality of directional members, such as 0°, 90°, ±45° directional members, etc., are laminated, fabric members comprising warp threads and weft threads, and so forth) instead.

In addition, the adhesion layer 3 comprises a sheet member comprising a thermoplastic resin, or is obtained by charging a molten material of thermoplastic resin in a mold and having it cure, and so forth.

Thus, the matrix resin 1a of the base member 1, the matrix resin 2a of the reinforcement member 2, and the adhesion layer 3 all comprise a thermoplastic resin. They may all be amorphous plastics, or they may all be crystalline plastics. Also, one may be an amorphous plastic while the others are crystalline plastics.

Examples of the crystalline plastics employed may include any one of polyethylene (PE), polypropylene (PP), nylon (PA: nylon 6, nylon 66, etc.), polyacetal (POM), and polyethylene terephthalate (PET).

In addition, examples of the amorphous plastics employed may include any one of polystyrene (PS), polyvinyl chloride (PVC), polymethyl methacrylate (PMMA), ABS resin, and thermoplastic epoxy.

Further, for the fiber materials contained in the thermoplastic resins, any one of, or a composite comprising two or more of, the following may be employed: ceramic fibers such as boron, alumina, silicon carbide, silicon nitride, zirconia, etc.; inorganic fibers such as glass fiber, carbon fiber, etc.; metal fibers such as copper, steel, aluminum, stainless steel, etc.; and organic fibers such as polyamide, polyester, etc.

However, with respect to the matrix resin 2a of the reinforcement member 2, assuming Tg1 denotes its glass transition point if it is an amorphous plastic, or Tm1 its melting point if it is a crystalline plastic, and with respect to the adhesion layer 3, assuming Tg2 denotes its glass transition point if it is an amorphous plastic, or Tm2 its melting point if it is a crystalline plastic, then their matrix resins are so selected as to satisfy one of the following relational expressions.

$$Tg1 > Tg2 \text{ or } Tm2 \quad (1)$$

$$Tm1 > Tg2 \text{ or } Tm2 \quad (2)$$

In addition to the relational expressions above, it is preferable that the matrix resin 1a of the base member 1 be formed from the same material as the matrix resin of the reinforcement member 2. This is because, with respect to the fiber-reinforced plastic 10 in which the base member 1 and the reinforcement member 2 are integrated with the adhesion layer 3 in-between, this would make such physical properties as linear expansion coefficient, Young's modulus, etc., be identical between the base member 1 and the reinforcement member 2, thereby making design management easier, while also suppressing any damage that may result if the two were to exhibit different heat distortion amounts.

With the illustrated fiber-reinforced plastic 10, the base member 1 and the reinforcement member 2 are made to adhere to each other favorably by the adhesion layer 3. Further, in forming this adhesion, the matrix resin 2a of the reinforcement member 2 is not softened or melted, or is unlikely to be softened or melted. Thus, bends in the continuous fibers 2b are suppressed, producing the fiber-reinforced plastic 10 that has high strength and in which the desired physical properties (tensile strength, etc.) are ensured for the reinforcement member 2.

Next, embodiments of methods of producing the fiber-reinforced plastic 10 are generally described with reference to FIGS. 2 to 4.

Figure 2:
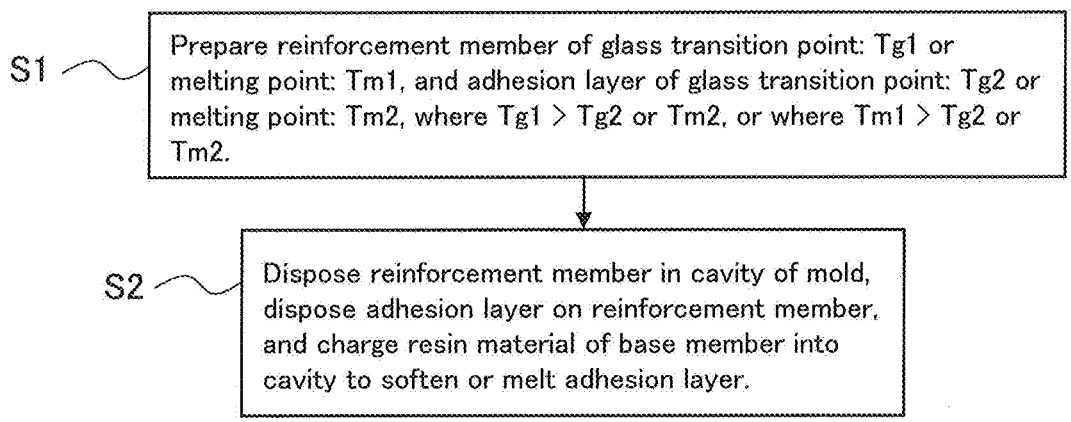
FIG. 2 is a flowchart of an embodiment of a method of producing a fiber-reinforced plastic of the present invention.

In the embodiment of a production method indicated in FIG. 2, first, the reinforcement member 2, which satisfies either relational expression (1) or (2) mentioned above, and the adhesion layer 3, which comprises, for example, a fixed-shape sheet member, are prepared (step S1).

Next, the reinforcement member 2 is disposed within the cavity of a mold not shown in the drawings. The adhesion layer 3 is disposed on the reinforcement member 2. A resin material of the base member 1, which is of the same material as the reinforcement member 2, or a resin material of the base member 1 with a Tm or Tg value higher than at least the Tm or Tg value of the adhesion layer 3, is charged into the cavity to soften or melt just the adhesion layer 3, thereby producing the fiber-reinforced plastic 10 in which the reinforcement member 2 and the base member 1 adhere to each other with the adhesion layer 3 in-between (step S2).

With respect to the manner of charging the resin material of the base member 1 in step S2 above, there are, broadly, two methods.

One is an injection molding method where a molten rein material of the base member 1 is injected into the cavity.

The other is a method where a softened or molten preform is formed by preheating a resin material of the base member 1, which is then disposed on the reinforcement member 2 within the cavity and press molded.

With this production method, over the course of producing the fiber-reinforced plastic 10, upon charging the resin material of the base member 1 into the cavity, just the adhesion layer 3 is softened or melted, thereby making the base member 1 and the reinforcement member 2 adhere to each other favorably by means of the adhesion layer 3. Further, in forming this adhesion, because the matrix resin of the reinforcement member 2 is not softened or melted, or is unlikely to be softened or melted, bends in the continuous fibers 2b are suppressed, making it possible to produce the fiber-reinforced plastic 10 that has high strength and in which the desired physical properties (tensile strength, etc.) are ensured for the reinforcement member 2.

Figure 3:
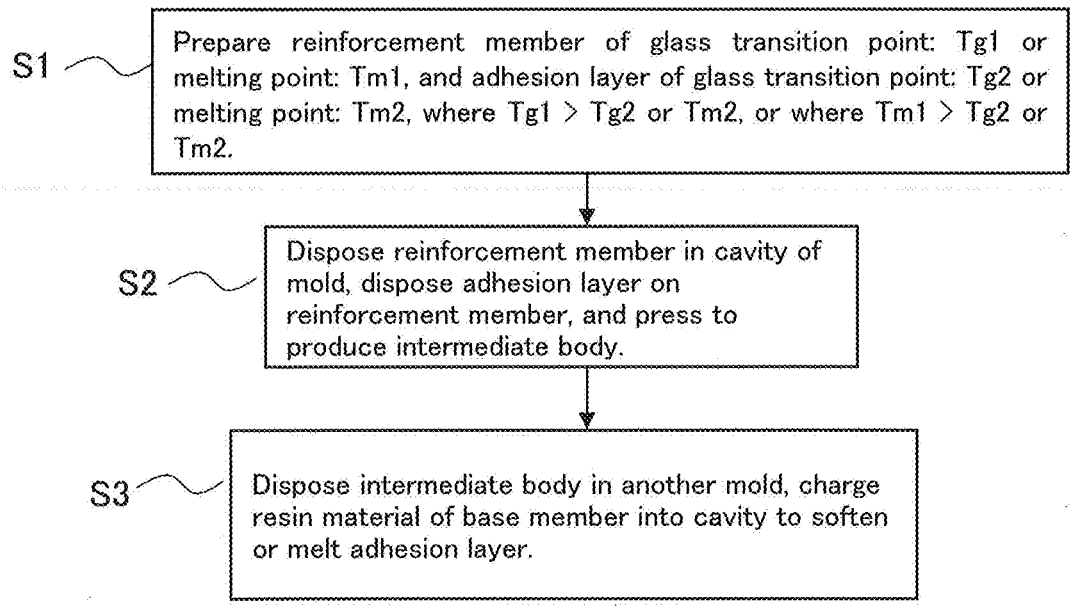
FIG. 3 is a flowchart of another embodiment of a method of producing a fiber-reinforced plastic of the present invention.

On the other hand, in the embodiment of a production method indicated in FIG. 3, as with the production method indicated in FIG. 2, first, the reinforcement member 2, which satisfies either relational expression (1) or (2) mentioned above, and the adhesion layer 3, which comprises, for example, a fixed-shape sheet member, are prepared (step S1).

Next, the reinforcement member 2 thus prepared is disposed within the cavity of a mold not shown in the drawings. A softened or molten preform obtained by preheating the adhesion layer 3 comprising the fixed-shape sheet member is disposed thereon and press molded, thereby producing an intermediate body (step S2).

Next, this intermediate body is disposed within the cavity of another mold not shown in the drawings. A resin material of the base member 1 is charged into the cavity to soften or melt the adhesion layer 3, and the fiber-reinforced plastic 10 in which the reinforcement member 2 and the base member 1 adhere to each other with the adhesion layer 3 in-between is produced (step S3).

Figure 4:
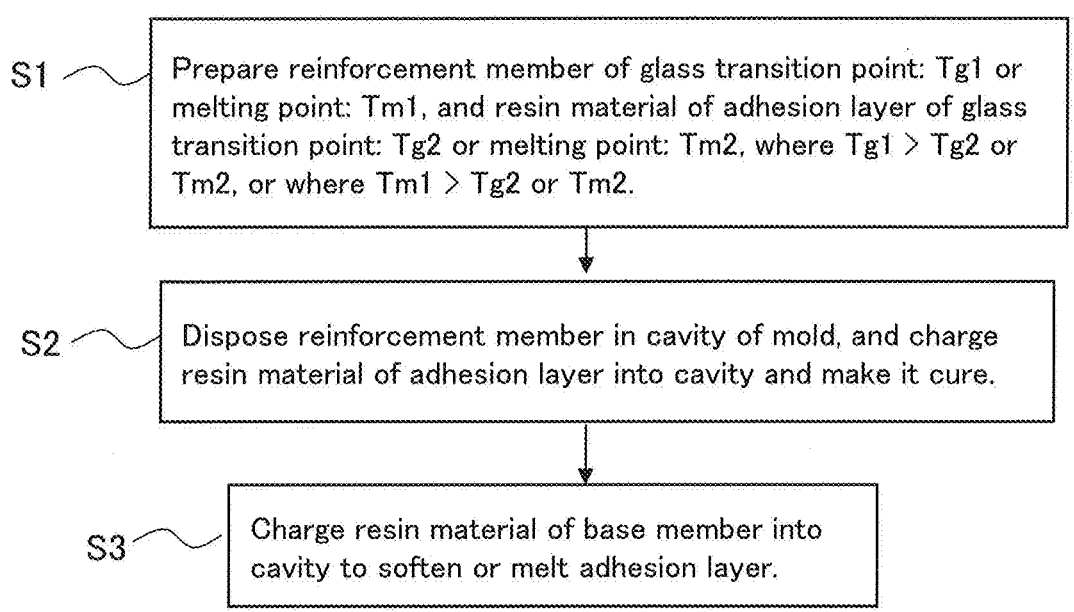
FIG. 4 is a flowchart of a further embodiment of a method of producing a fiber-reinforced plastic of the present invention.

Further, in the embodiment of a production method indicated in FIG. 4, the reinforcement member 2, which satisfies either relational expression (1) or (2) mentioned above, and a resin material of the adhesion layer 3 are prepared (step S1).

Next, the reinforcement member 2 is disposed within the cavity of a mold not shown in the drawings, and the resin material of the adhesion layer 3 is charged into the cavity and made to cure (step S2).

Next, a resin material of the base member 1 is charged into the cavity of this mold to soften or melt the adhesion layer 3, and the fiber-reinforced plastic 10 in which the reinforcement member 2 and the base member 1 adhere to each other with the adhesion layer 3 in-between is thus produced (step S3).

[Experiment assessing the presence/absence of bends in the continuous fibers forming the reinforcement member, and results thereof]

The present inventors produced fiber-reinforced plastics of the form shown in FIG. 1 (Example), and fiber-reinforced plastics of a conventional structure (Comparative Example) where the adhesion layer is removed from the Example, and conducted an experiment to assess the presence/absence of bends in the continuous fibers forming the reinforcement member s for both.

In this experiment, materials were varied for both the Example and the Comparative Example, thus producing two types of each.

In Example 1, the base member was molded from a resin material in which discontinuous fibers were contained in a matrix resin comprising nylon (the Tm value of nylon 6 is approximately 220° C., and the Tm value for nylon 66 is approximately 260° C.). The reinforcement member was molded from a resin material in which continuous fibers were contained in a matrix resin comprising the same nylon material as the base member (UD member). The adhesion layer was molded from a thermoplastic epoxy (the Tg values of thermoplastic epoxies vary, e.g., 105° C., 120° C., etc.). Glass fiber and carbon fiber were used for the discontinuous fibers and continuous fibers. Example 1 was produced employing the production method indicated in FIG. 3.

By contrast, Comparative Example 1 omits the adhesion layer from Example 1. The fiber-reinforced plastic of Comparative Example 1 was produced by disposing the reinforcement member in the cavity of the mold, and charging the molten resin material of the base member into the cavity.

On the other hand, in Example 2, the base member was molded from a resin material in which discontinuous fibers were contained in a matrix resin comprising polypropylene (PP) (the Tm value of PP is approximately 160° C.). The reinforcement member was molded from a resin material in which continuous fibers were contained in a matrix resin comprising the same polypropylene (PP) material as the base member. The adhesion layer was molded from a thermoplastic epoxy (the Tg values of thermoplastic epoxies vary, e.g., 105° C., 120° C., etc.). Glass fiber and carbon fiber were used for the discontinuous fibers and continuous fibers. The fiber-reinforced plastic of Example 2 was also produced employing the production method indicated in FIG. 3.

Figure 5:
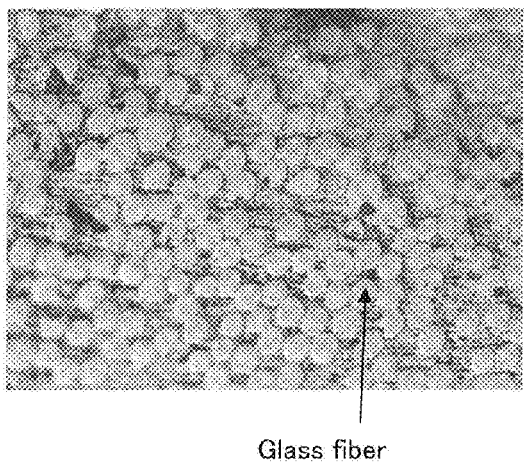
FIG. 5(a) is a photograph of a horizontal cross section of a reinforcement member forming a fiber-reinforced plastic of a conventional structure, (b) is a photograph of a vertical cross section of (a), (c) is a photograph of a horizontal cross section of a reinforcement member forming a fiber-reinforced plastic of the present invention, (d) is a photograph of a vertical cross section of (c), and (e) is a schematic representation of (d).
Figure 5:
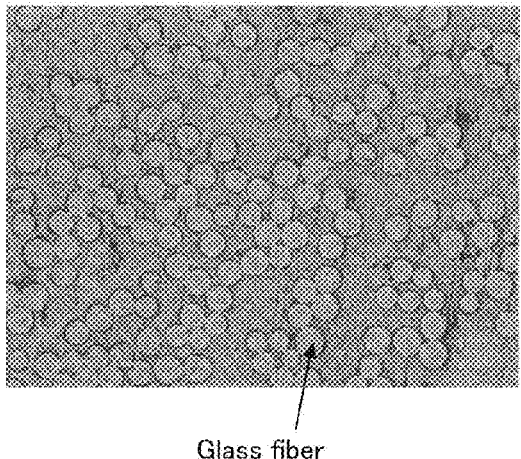
Figure 5:
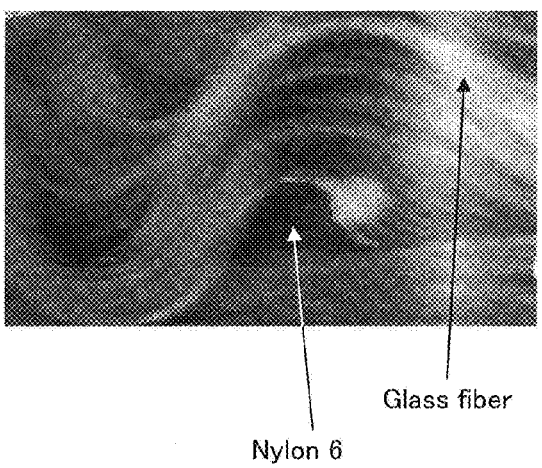
Figure 5:
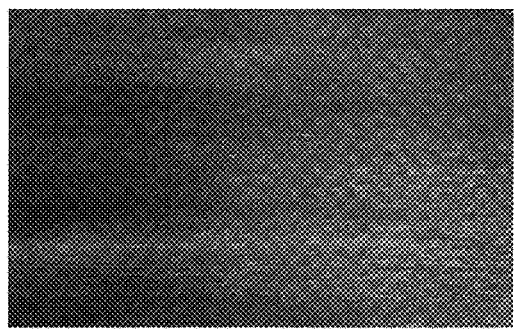
Figure 5:
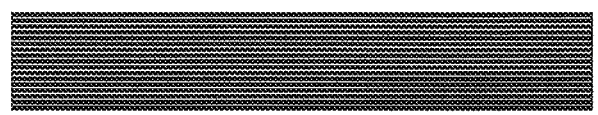

A photograph of a horizontal cross section of the reinforcement member forming the fiber-reinforced plastic of Comparative Example 1 is shown in FIG. 5a, and a photograph of its vertical cross section in FIG. 5b. A photograph of a horizontal cross section of the reinforcement member forming the fiber-reinforced plastic of Example 1 is shown in FIG. 5c, and a photograph of its vertical cross section in FIG. 5d. Further, a schematic representation of FIG. 5d is shown in FIG. 5e.

As is evident from a comparison of FIG. 5b and FIG. 5d, it was verified that, whereas the continuous fibers forming the reinforcement member of Comparative Example 1 bend significantly, the continuous fibers forming the reinforcement member of Example 1 do not, and they are oriented unidirectionally in a substantially uniform manner.

This is determined by whether or not there is, between the base member and the reinforcement member, an adhesion layer with a lower Tg value than the Tm value of the reinforcement member. By having the orientation of the continuous fibers be uniformly aligned unidirectionally as in Example 1, the desired physical properties may be ensured for the reinforcement member, thereby resulting in a high-strength fiber-reinforced plastic.

Embodiments of the present invention have been described in detail above with reference to the drawings. However, its structures are by no means limited specifically to these embodiments. Even if design modifications, etc., are made within a scope that does not depart from the spirit of the present invention, they are to be included in the present invention.

REFERENCE SIGNS LIST

1: Base member
1': Planar member
1": Rib
1a: Matrix resin
1b: Fiber material (long fiber material, short fiber material)
2: Reinforcement member (continuous fiber-reinforced resin member)
2a: Matrix resin
2b: Continuous fiber
3: Adhesion layer
10: Fiber-reinforced plastic

The invention claimed is:

1. A method of producing a fiber-reinforced plastic in which at least a portion of a resin member, which is a base member, not containing a fiber material or containing a short fiber or a long fiber, is laminated with, as a reinforcement member, a continuous fiber-reinforced resin member in which a continuous fiber is mixed into a thermoplastic resin, which is a matrix resin, the fiber-reinforced plastic being reinforced by this laminated portion, the method comprising:

a step of preparing an adhesion layer and the reinforcement member in which, with respect to the thermoplastic resin of the reinforcement member, assuming $Tg1$ denotes its glass transition point if it is an amorphous plastic, or $Tm1$ its melting point if it is a crystalline plastic, and with respect to a thermoplastic resin of the adhesion layer, assuming $Tg2$ denotes its glass transition point if it is an amorphous plastic, or $Tm2$ its melting point if it is a crystalline plastic, then $Tg1>Tg2$ or $Tm2$, or $Tm1>Tg2$ or $Tm2$; and a step of disposing the reinforcement member within a cavity of a mold, disposing the adhesion layer on the reinforcement member, charging a resin material of the base member into the cavity to soften or melt the adhesion layer, and producing the fiber-reinforced plastic in which the reinforcement member and the base member are made to adhere to each other with the adhesion layer in-between.

2. The method according to claim 1, wherein a matrix resin of the base member and the matrix resin of the continuous fiber-reinforced resin member comprise the same material.

* * * * *